United States Patent [19]

Philippe

[11] Patent Number: 4,978,264
[45] Date of Patent: Dec. 18, 1990

[54] SECURING DEVICE FOR SECURING A MEMBER TO A SUPPORT PLATE AND HAVING AN EXPANDABLE BOSS

[75] Inventor: Eric Philippe, St. Germain en Laye, France

[73] Assignee: Valeo Vision, Cedex, France

[21] Appl. No.: 412,324

[22] Filed: Sep. 25, 1989

[30] Foreign Application Priority Data

Sep. 23, 1988 [FR] France ............................. 88 12435

[51] Int. Cl.⁵ ............................................. F16B 13/04
[52] U.S. Cl. ....................................... 411/26; 411/27; 411/55
[58] Field of Search ..................... 411/24–27, 411/28, 55, 60, 77, 44, 50–53

[56] References Cited

U.S. PATENT DOCUMENTS

| | | |
|---|---|---|
| 1,349,437 | 8/1920 | Royer . |
| 2,373,585 | 4/1945 | Mancini ............................... 411/52 |
| 3,196,733 | 7/1965 | Cohen et al. ........................... 411/51 |
| 3,534,936 | 10/1970 | Knowlton . |
| 3,911,782 | 10/1975 | Leibig . |
| 3,974,734 | 8/1976 | Machtle ................................. 411/26 |
| 4,020,735 | 5/1977 | Herback ................................ 411/26 |
| 4,478,542 | 10/1984 | Whelan, Jr. ........................... 411/26 |

FOREIGN PATENT DOCUMENTS

| | | |
|---|---|---|
| 280589 | 1/1965 | Australia ............................... 411/24 |
| 1938828 | 2/1970 | Fed. Rep. of Germany . |
| 2330691 | 1/1975 | Fed. Rep. of Germany . |
| 1423221 | 11/1967 | France ................................. 411/44 |
| 2203452 | 5/1974 | France . |
| 46-1924 | 1/1971 | Japan ................................... 411/55 |
| 603713 | 6/1948 | United Kingdom . |
| 1319516 | 6/1973 | United Kingdom . |

Primary Examiner—Neill R. Wilson
Attorney, Agent, or Firm—Wenderoth, Lind & Ponack

[57] ABSTRACT

A securing device of the expandable boss or grommet type, for securing a member to a support plate, has an expandable boss of a resiliently deformable material extending through the support plate. A fixing bolt extends through the expandable boss and is screwed into an expander nut, the fixing bolt having a head which bears through a head ring on the member to be secured, and the expandable boss including a shouldered head.

10 Claims, 2 Drawing Sheets

SECURING DEVICE FOR SECURING A MEMBER TO A SUPPORT PLATE AND HAVING AN EXPANDABLE BOSS

FIELD OF THE INVENTION

This invention relates to a securing device, of the kind having an expandable boss or grommet, for securing a member to a support plate, the member being for example an element of a lighting or signalling assembly for an automotive vehicle.

BACKGROUND OF THE INVENTION

Securing devices of the above kind, which form in general a fastener of a rivet-like kind, have been proposed in the past. These prior art devices comprise an expandable boss or grommet which extends through the members which are to be assembled together, and through which there extends a fixing screw which is screwed into an expander nut. The expander nut cooperates with the free, split end of the expandable boss, in such a way as to dilate the end wall of the latter behind the support plate, so as to fix the said member against the support plate by an axial clamping action. This type of device is for example described in U.S. Pat. No. 3,911,782. Lateral adjustment of the said member in all directions in a plane with respect to the support plate may be made possible by providing a predetermined clearance within the hole that is formed through the support plate, and through which there extend, in particular, the expandable boss and the fixing bolt.

By contrast, axial adjustment of the distance between the said member and the support plate, in a direction perpendicular to the said plane, can only be made possible by inserting one or more spacing rings or shims, which complicates the operation of assembling the member into position.

SUMMARY OF THE INVENTION

An object of the invention is to overcome the above disadvantage, by providing means which permit the position of the member with respect to the support plate to be adjusted in the axial direction of the fixing screw, that is to say the mutual spacing between the member and the support plate can be adjusted without necessitating a spacing element.

To this end, the invention provides a securing device of the expandable boss type, for securing a member on to a support plate, the fixing device being of the type comprising an expandable boss of resiliently deformable material extending through the support plate, with a fixing screw extending through the expandable boss and the fixing screw being screwed into an expander nut and having a head which bears on the member through a head ring, the device being characterised in that the expandable boss comprises a shouldered head.

According to another feature of the invention, the axial hole through the expandable boss, through which the fixing screw extends, is divergent from its middle portion towards the two ends of the expandable boss, with the expander nut and a boss portion which forms an axial extension of the head ring extending respectively into the two divergent portions and having corresponding lateral surfaces.

According to a further feature of the invention, the securing device is pre-assembled with the member which is to be secured to the support plate, the member being gripped between the head ring and the shouldered head of the expandable boss under the clamping action of the fixing bolt and expander nut in combination.

Further features and advantages of the invention will appear more clearly from the description which follows, and which is given with reference to the accompanying drawings. The drawings show a preferred embodiment of the invention.

DESCRIPTION OF THE PREFERRED EMBODIMENT

Figure 1:
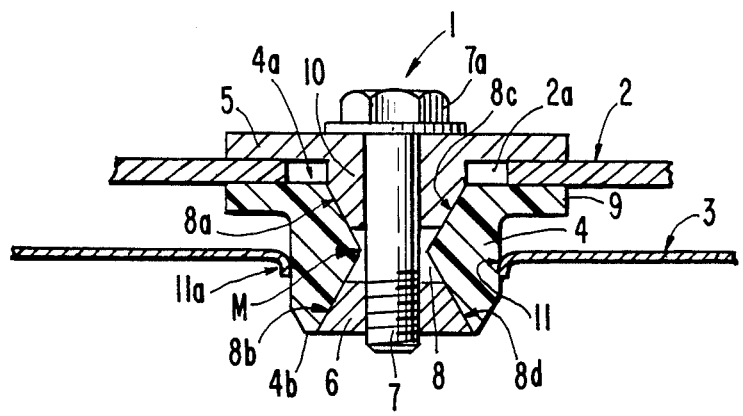
FIG. 1 shows, in axial cross section, a securing device according to the invention.
Figure 2:
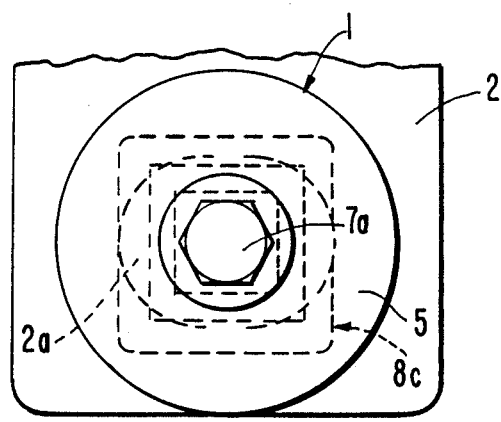
FIG. 2 is a top plan view of the securing device shown in FIG. 1.
Figure 3:
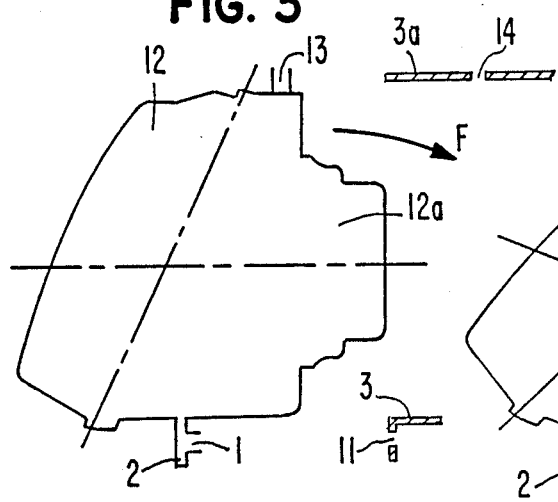
FIGS. 3 to 6 show diagrammatically the successive stages in the operation of mounting on the body of an automotive vehicle a headlamp which is equipped with the securing device according to the invention.

The securing device, shown in FIG. 1 fully assembled, is designated in this condition by the reference numeral 1, and is arranged to secure a member 2 to a support plate 3. The device 1 essentially comprises an expandable boss 4, a head ring 5, an expander nut 6, and a bolt 7. The bolt 7 screws into the expander nut 6 after passing successively through the head ring 7, the member 2 and the boss 4.

The expandable boss 4 is formed of a resiliently deformable material, and has a through hole 8 which is divergent towards the two ends of the boss 4 from approximately the middle portion M of the hole 8. The divergent portions of the hole 8 may be constituted by two frusto-conical portions 8a and 8b, opposed to each other with their common smallest cross section defined at the middle portion M of the hole 8. In a modification, the divergent portions of the hole 8 are pyramidal in shape as indicated at 8c and 8d.

A shouldered head 9 is formed integrally with the boss 4, and the member 2 is gripped between the head 9 and the head ring 5 under the clamping pressure exerted by the bolt 7 extending through the head ring 5, on which it bears by means of its head 7a, the clamping force being generated by virtue of the engagement of the bolt 7 with the expander nut 6. The head ring 5 is extended by an integral boss portion 10, having a lateral surface corresponding to the frusto-conical lateral surface 8a or pyramidal lateral surface 8c of the expandable boss 4, in which it is adjustable. In the same way, the expander nut 6 has a lateral surface corresponding to the frusto-conical lateral surface 8b or the pyramidal lateral surface 8d of the expander nut 4, into which the expander nut 6 penetrates.

The assembly 1 of the securing device is first of all mounted on the member 2 which is to be secured. Lateral adjustment of the member 2 with respect to the axis of the securing device is then possible by virtue of a clearance which is provided in the hole 2a which is formed in the member 2 and through which the boss portion 10 and bolt 7 project. The hole 2a is preferably made in the form of a slot.

After the above mentioned adjustment has been effected, the bolt 7 is screwed in, and the expander nut 6 acts on the expandable boss 4, thus causing the member 2 to be gripped between the head ring 5 and the shouldered head 9 of the expandable boss 4. At this stage, clamping is effected in such a way that the expandable boss 4 does not undergo any substantial radial expansion. The assembly of parts thus secured together is then introduced into a hole 11 which is formed in the support plate 3. The hole 11 is bounded by an axial collar portion 11a and its diameter is substantially equal to the outer diameter of the boss 4, in such a way as to allow the boss 4 to undergo an axial displacement within the hole 11 in order to set the required spacing between the member 2 and the support plate 3.

Once the expandable boss 4 has been introduced into the hole 11 in such a way as to set the required spacing mentioned above, the head 7a of the bolt 7 is again turned so as to cause further axial displacement of the nut 6 to take place along the shank of the bolt 7, so that the nut and bolt together then exert an axial force on the expandable boss 4, which itself exerts pressure on the boss portion 10. This axial pressure, resolved by the frusto-conical surfaces 8a, 8b or pyramidal surfaces 8c, 8d, tends to dilate the expandable boss 4 and thus to set up a radial clamping force of the expandable boss 4 in the hole 11.

As can be seen from FIGS. 3 to 6, the member 2 is one of the peripheral lugs, fixed with respect to an optical block 12, of a headlamp of an automotive vehicle. The optical block 12 may be secured by means of the lugs 2 within a housing or bowl, or on the bodywork 3 of the vehicle itself, in such a way that its optical axis can be displaced in horizontal and vertical planes in order to adjust the orientation of the light beams.

Figure 4:
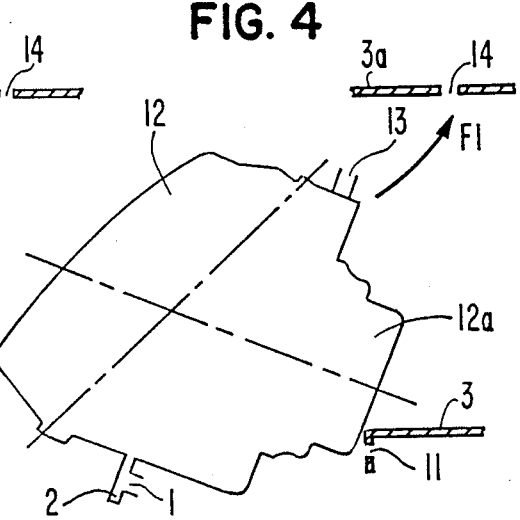

FIGS. 3 to 6 show diagrammatically the successive steps in the operation of mounting such an optical block 12 in position. The member 2, being in the form of a lug connected to the optical block 12, carries the securing device 1 which has been assembled thereon in the manner described above. The optical block 12 is presented in front of its housing, so as to pass through the front opening of the latter, after the optical block has been tilted slightly as indicated by the arrow F in FIG. 3, in such a way that one of the lugs 13, fixed on the upper part of the optical block 12, can enter a hole 14 which is formed on the upper part of the housing provided in the bodywork 3a, as indicated in FIG. 4. The rear part of the optical block 12 is thus received in the housing, after which the lug 13 is presented to the hole 14 in a movement indicated by the arrow F1 in FIG. 4.

Figure 5:
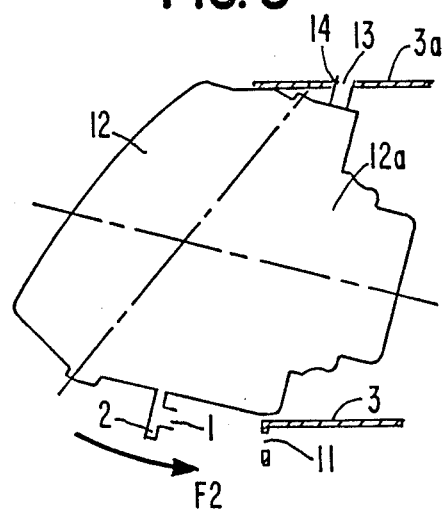
Figure 6:
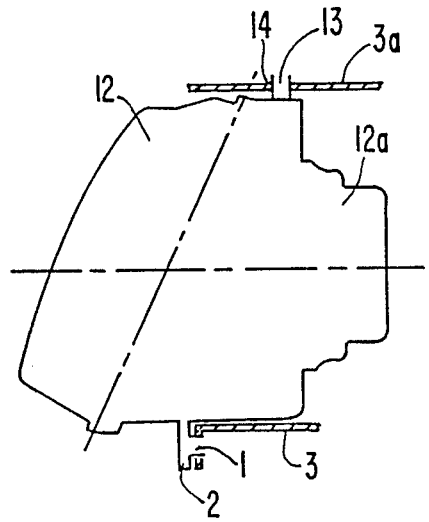

Once the lug 13 has been inserted into the hole 14 of the bodywork in which it is to engage, the optical block 12 is moved as indicated by the arrow F2 in FIG. 5, so as to tilt the block about the pivot defined by the lug 13 in the hole 14, so that the free end of the expandable boss 4 of the securing device 1 passes into the hole 11. The securing device 1 is then fully secured in the manner described above.

What is claimed is:

1. A securing device for securing a member to a support plate, said securing device comprising:
    means for holding the member to be secured; and
    means for adjustably fixing the member to the support such that a space between the member and the support can be adjusted;
    wherein said means for adjustably fixing comprises a resiliently deformable expandable boss having an axial hole therethrough, a bolt extending into said axial hole and an expander nut threaded onto said bolt for engagement and expansion of said resiliently deformable expandable boss, whereby said expandable boss can be axially adjustably positioned in an aperture of the support; and
    said means for holding comprises a head ring on said bolt and a shoulder on said resiliently deformable expandable boss for receiving and holding the member therebetween;
    wherein said axial hole in said expandable boss tapers inwardly at both ends thereof, whereby said expander nut may engage said axial hole at a first said inwardly tapering end thereof to expand said expandable boss.

2. The securing device as set forth in claim 1, wherein:
    said expander nut is tapered complementarily to said inwardly tapering end of said axial hole.

3. The securing device as set forth in claim 1, wherein:
    a middle point of said axial hole has said respective inwardly tapering ends tapering thereto; and
    said head ring has a boss portion thereon tapered complementarily to and for engagement with said inwardly tapering other end of said axial hole.

4. The securing device as set forth in claim 3, wherein:
    each of said inwardly tapering ends of said axial hole is a frustoconical section having a minimum diameter end, said frustoconical sections being connected at their respective said minimum diameter ends to form said middle point.

5. The securing device as set forth in claim 3, wherein:
    each of said inwardly tapering ends of said axial hole is a pyramidal section having a minimum cross section end, said pyramidal sections being connected at their respective said minimum cross section ends to form said middle point.

6. A securing device for securing a member to a support plate, said securing device comprising:
    an expandable boss made of a resiliently deformable material for fixation in an aperture of the support by expansion and engagement of said expandable boss in the aperture of the support, said expandable boss having an axial hole therethrough, and said axial hole having an inwardly tapering surface;
    a bolt extending into said axial hole;
    an expander not threaded onto said bolt for expanding said expandable boss, said expander nut having a tapering surface complementary to and for engagement with said inwardly tapering surface of said axial hole;
    a shoulder portion on said expandable boss for receiving the member to be secured thereagainst; and
    a head ring on said bolt for holding the member between itself and said shoulder portion of said expandable boss, wherein said axial hole has a second inwardly tapering surface for engagement with said head ring on said bolt.

7. The securing device as set forth in claim 6, wherein:
    said shoulder portion on said expandable boss comprises a flange extending radially outwardly from said expandable boss; and
    said head ring is a radially outwardly extending member surrounding said bolt.

8. The securing device as set forth in claim 6, wherein:
    said bolt extends through said axial hole from one side of said expandable boss to the other side thereof, said expander nut and said inwardly tapering surface of said axial hole located at said other side, and said head ring being located at said one side.

9. The securing device as set forth in claim 8, wherein:
   said second inwardly tapering surface is located at said one side; and
   said head ring has a tapered boss portion complementary to and for engagement with said second inwardly tapering surface.

10. A securing device for securing a member to a support plate, said securing device comprising:
   an expandable boss made of a resiliently deformable material for fixation in an aperture of the support by expansion and engagement of said expandable boss in the aperture of the support, said expandable boss having an outer, axially extending surface for engagement with the aperture, an axial hole extending through said expandable boss, said axial hole having an inwardly tapering surface at one end of said expandable boss, and said expandable boss having at the other end thereof an integral shoulder portion extending radially outwardly beyond the radial extent of said outer, axially extending surface and a second inwardly tapering surface;
   a bolt extending into said axial hole;
   an expander nut threaded onto said bolt for expanding said expandable boss, said expander nut having a tapering surface complementary to and for engagement with said inwardly tapering surface of said axial hole; and
   a head ring on said bolt for holding the member between itself and said shoulder portion of said expandable boss, said head ring having a tapered boss portion complementary to and for engagement with said second inwardly tapering surface.

* * * * *